United States Patent [19]

Chlebowski

[11] 4,357,745
[45] Nov. 9, 1982

[54] METHOD OF WELDING LINED PIPE

[75] Inventor: Edmund M. Chlebowski, Southbury, Conn.

[73] Assignee: Uniroyal, Inc., New York, N.Y.

[21] Appl. No.: 244,351

[22] Filed: Mar. 16, 1981

[51] Int. Cl.³ .............................................. B23P 19/04
[52] U.S. Cl. ..................................... 29/460; 29/527.2; 138/141; 138/146; 228/214; 285/55
[58] Field of Search ....................... 29/458, 460, 527.2, 29/527.4; 228/175, 214; 156/158; 138/141, 145, 146; 285/55

[56] References Cited

U.S. PATENT DOCUMENTS 3,541,670 11/1970 McCrory, Jr. ..................... 285/55 X
3,890,483 6/1975 Webster ............................. 29/458 X
3,916,502 11/1975 Bagnulo ............................. 29/460 X

FOREIGN PATENT DOCUMENTS 51-14548 5/1976 Japan ................................. 156/158

*Primary Examiner*—Carl E. Hall
*Attorney, Agent, or Firm*—Marvin Bressler

[57] ABSTRACT

The ends of two sections of lined pipe (e.g. polyurethane lined steel pipe), in which the lining terminates a definite distance from each pipe end, and butted together, with an internal concentric sleeve spanning the unlined pipe ends and defining an annular hollow casting space at the area to be joined. The butted ends are then welded together at the joint. Thereafter a curable liquid polymer (e.g., liquid polyurethane composition) is introduced into the casting space through an opening in the unlined section of pipe, and cured to a solid state in situ. The opening is then plugged.

6 Claims, 9 Drawing Figures

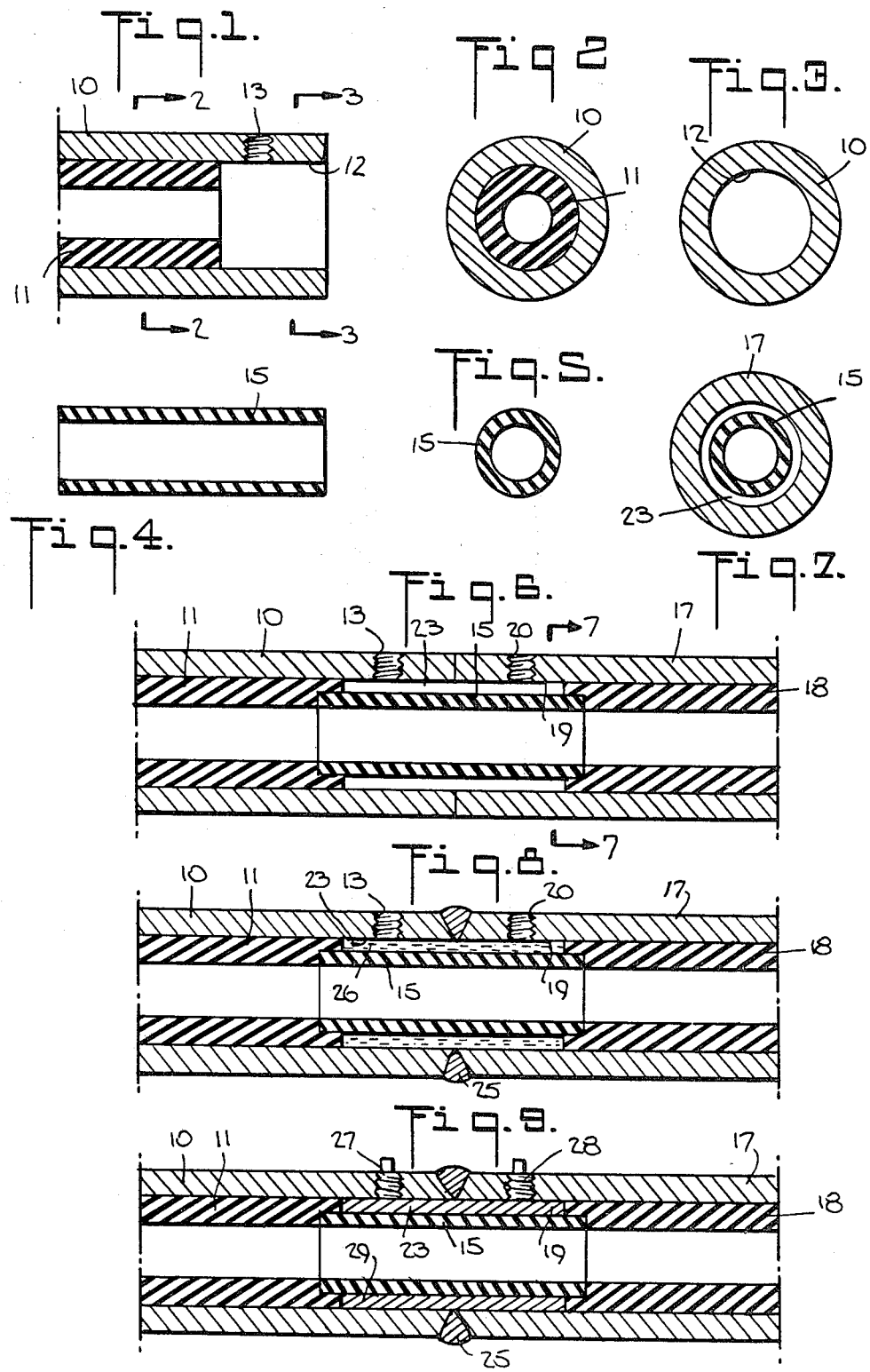

METHOD OF WELDING LINED PIPE

This inventin relates to a method of joining lined pipe, and to the joined pipe made by such method.

Heretofore it has not been feasible to join together by welding lengths of pipe, such as steel pipe, lined with an organic polymer that is destroyed by excessive heating (such as a polyurethane lining), because of the destructive effect of the heat of welding on the lining. Therefore joining such lined piped in prior practice typically involved providing the pipe ends with welded on flanges prior to lining, which then had to be bolted together using a gasket. Not only was this costly, but also very time consuming. The sometimes used vitaulic couplings were also subject to various disadvantages.

In accordance with the present invention, a method is provided for joining lined pipe by welding, in such manner that the heat-destructable lining is protected from excessive heating during the welding operation. This is accomplished by having the lining terminate a definite distance from the joint so that there is no lining material at the immediate area of the weld. Provision is made for casting in situ additional lining material at the site of the weld, subsequent to the welding strep, so that the final joined pipe is completely lined.

The invention will be described with reference to the accompanying drawing, wherein:

FIG. 1 is a fragmentary longitudinal sectional elevational view of a piece of lined pipe to be joined;

FIGS. 2 and 3 are transverse sectional views of the pipe taken along lines 2—2 and 3—3, respectively, of FIG. 1.

FIG. 4 is a longitudinal sectional elevational view of a cylindrical joining sleeve for use in joining the pipe;

FIG. 5 is a transverse sectional view of the sleeve;

FIG. 6 is a longitudinal sectional elevational view of two lined pipe lengths to be joined, assembled in butting relationship with the cylindrical joining sleeve positioned concentrically within;

FIG. 7 is a transverse sectional view of the assembly taken along line 7—7 of FIG. 6;

FIG. 8 is a view similar to FIG. 6 showing the butted ends of the pipe welded together at the joint, with a casting liquid in place within the assembly; and, FIG. 9 is a view similar to FIG. 8 of the finished welded assembly with the casting liquid cured to a solid state.

The pipe to be joined may be any weldable metal pipe, especially a ferrous metal such as cast iron, steel, stainless steel, etc., having a lining of any organic polymer that would normally be destroyed or at least severely damaged by the heat associated with welding, such as a lining of polyurethane elastomer or plastic. In accordance with known practice (e.g., U.S. Pat. No. 3,692,457, Pekor, Sep. 19, 1972; British Pat. No. 1,444,225, Webster et al., July 28, 1976) sections of pipe of virtually any desired length (e.g., 20 feet or longer) can be lined by centrifugal casting. The pipe is rotated at a speed which causes the urethane to be forced against the walls of the spinning pipe. The urethane is injected into the pipe in a liquid state, if desired at an elevated temperature. The urethane referred to involves a prepolymer mixed with a suitable catalyst or curing agent which will enable the urethane system to reamin liquid long enough to flow out the entire length of the pipe and release any trapped air so that the pipe is uniformly lined with the desired thickness throughout. An example of such a urethane system is the commercially available polyurethane known as Vibrathane B-602 (trademark) cured with MOCA[trademark; 4,4′-methylenebis(2-chloroaniline)]. This system, when processed at 200° F., will provide a pot life of approximately 14 minutes. Linings of, e.g. ¼ inch and ½ and greater, can be accomplished using this urethane system.

If preferred, an adhesive may be used to bond the urethane to the metal pipe. Typically the inside walls of the pipe are cleaned by rotary grit blast and adhesive is applied to the clean surface. It is possible to use a metal primer to protect the fresh metal surface immediately following grit blasting and a tie-coat over the primer just prior to centrifugaly casting the urethane liner.

The present method involves leaving a definite length (e.g., 3.25 to 4.5 inches) of the pipe unlined at the end to be joined, for example by masking the pipe end during the step of applying the lining, or by subsequently grinding away or otherwise removing the lining at the end. Thus, referring to the drawing, and particularly to FIGS. 1, 2 and 3 thereof, a length of pipe 10 to be joined has a urethane lining 11 which terminates a spaced distance from the end of the pipe leaving an unlined length 12. At least one hole 13 is provided through the wall of the pipe at the unlined section for subsequent introduction of casting liquid as will be described below.

The invention also involves providing a cylindrical bridging or joining sleeve 15 (FIGS. 4 and 5) which can be constructed of a variety of materials. It is preferred that the sleeve be an abrasion resistant material as similarto the lining as possible. A urethane sleeve can be used. A typical urethane polymer would be Vibrathane B-602 cured with MOCA as previously mentioned or possibly a harder durometer may be desirable such as Vibrathane B-600 or B-601 (trademarks) cured with MOCA. It is also possible to use sleeves constructed from other materials such as aluminum or steel, plastics, paper which has been coated, asbestos, concrete, etc.—provided the material has sufficient heat resistance to withstand the welding procedure. However, to provide a contiguous urethane lining, a urethane sleeve is preferred.

The sleeve 15 is of such size as to be positioned concentrically internally in a bridging position across the ends of two lengths of pipe to be joined, as shown in FIG. 6 wherein one pipe 10 as previously described and another such pipe length 17 have been placed in end-to-end butting relationship prior to welding, with the sleeve 15 previously inserted within the assembly. It will be understood that the second pipe length 17 also has a lining 18 which terminates at a spaced distance from the end of the pipe leaving an unlined section 19. An opening 20 is provided through the unlined portion 19 of the wall of pipe 17. The outside diameter of the sleeve 15 is less than the inside diameter of the unlined sections 12, 19 of the pipes 10, 17 but at least as great as the inside diameter of the linings 11, 18. Preferably the inside diameter of the sleeve is essentially the same as the inside diameter of the linings, to provide a smooth, uninterrupted bore or passageway through the joint from one pipe length to the other. The length of the sleeve 15 is slightly in excess of the combined lengths of the two unlined pipe sections 12, 19. Thus, if the unlined sections are each 4 inches long for example, the sleeve would typically be longer than 8 inches, say, 10 iches, so that one inch of the sleeve would press into each end of the linings. Although the sleeve could be mounted inside the lining it is preferably mounted flush with the lining so that it is not restrictive to flow.

Positioned in the manner described, the sleeve 15 forms a void or annular hollow casting space 23 defined at its outer wall by the inner unlined walls of the pipes, and defined at its inner wall by the outside wall of the sleeve, and defined at its ends by the terminus of the linings. The previously referred to openings 13, 20 in the pipe walls give access to the casting space 23, one opening serving for introducing casting material, the other opening serving as a vent. One such opening could suffice, but two openings are preferred, not only for venting but also to provide for the possibility of circulating air through the void 23 during the welding to cool the inside area and to relieve any pressure resulting from gases generated during the welding process. These holes can be tapped to facilitate insertion of plugs later. If the pressure rating of the pipe requires it, the area of the pipe around the holes may be strengthened (e.g., thickened by welding on additional material).

After the sleeve is assembled concentrically with the butted together pipe ends as described, the pipe ends are joined by a weld 25 (FIG. 8) in the conventional manner. Electric-arc or heli-arc welding are preferred. Air can be circulated through the inside of the pipe or through the void 23 as mentioned previously. During welding the pipe is spot welded initially and then a bead is welded into the seam. It is also possible to use a heat sink in the vicinity of the welded area.

After the pipe has been welded and allowed to cool, a curable (solidifiable) liquid such as a liquid polyurethane composition 26 (FIG. 8) is introduced into the cavity 23 through one of the openings 13, 20 to completely fill the cavity. For field application a cold pour system, e.g. Vibrathane B-601 and Curene 243 (trademark) can be used or Vibrathane 602-MOCA can be used in the same method as in installing the rest of the lining. After filling the cavity 23 completely the ports 13, 20 are closed with plugs 27, 28 (FIG. 9) and the urethane is allowed to set-up and cure to form an annular solid body 29.

The resulting pipe is completely lined with urethane. The urethane poured into the void following welding will knit to the ends of the lining of each pipe as well as to the inserted sleeve. By proper selection of urethane, it is possible that the lining be continuous and homogeneous - yet coupled by welding.

An example of a liquid urethane composition suitable for lining the pipe and casting in the annular void is that described in U.S. Pat. No. 3,725,354, Norman K. Sundholm, Apr. 3, 1973, col. 6 lines 1–8; further suitable materials are described in the same patent at col. 7, line 50 to col. 8 line 44.

What is claimed is:

1. A method of joining lined pipe comprising providing two lengths of weldable metal pipe to be joined, said pipe having a lining of heat-destructable organic polymer terminating a definite distance from the end of each pipe length to be joined, providing a hollow sleeve member having an outside diameter less than the inside diameter of the pipe but at least as great as the inside diameter of the lining, the length of said sleeve being slightly in excess of the combined lengths of the two unlined sections of the pipe to be joined, positioning the two pipe lengths in butting relationship with the sleeve positioned concentrically within so as to bridge the joint between the two pipe lengths and form an annular hollow casting chamber defined on the outside by the unlined inner wall of the pipe and defined on the inside by the outer wall of the sleeve and defined at its ends by the terminus of the lining at least one unlined section of pipe being provided with a hole through its wall giving access to the said casting chamber, welding the pipe lengths together at the butt joint, the heat-destructable organic polymer lining being protected from excessive heat consequent to the welding step by the fact that the lining terminates a substantial distance from the welded joint, cooling the weld, filling the hollow casting chamber through said hole in the pipe wall with a curable organic liquid material and curing the liquid in situ to a solid polymeric state, and plugging the said hole.

2. A method as in claim 1 in which the said organic pipe lining is a polyurethane polymer.

3. A method as in claim 1 in which the said sleeve is made of polyurethane.

4. A method as in claim 1 in which the said curable organic liquid material is a polyurethane composition.

5. A method as in claim 1 in which the inside diameter of the sleeve is essentially the same as the inside diameter of the lining, whereby a smooth passageway through the pipe is provided.

6. A method as in claim 5 in which the lining, the sleeve, and the curable organic liquid are all polyurethane compositions, so that a contiguous, integral polyurethane lining is provided across the welded joint.

* * * * *